United States Patent [19]
Litchford et al.

[11] Patent Number: 5,198,823
[45] Date of Patent: Mar. 30, 1993

[54] PASSIVE SECONDARY SURVEILLANCE RADAR USING SIGNALS OF REMOTE SSR AND MULTIPLE ANTENNAS SWITCHED IN SYNCHRONISM WITH ROTATION OF SSR BEAM

[75] Inventors: George B. Litchford, Northport; John Keller, Huntington, both of N.Y.

[73] Assignee: Litchstreet Co., Northport, N.Y.

[21] Appl. No.: 813,137

[22] Filed: Dec. 23, 1991

[51] Int. Cl.⁵ .................. G01S 5/02; G01S 13/00; G01S 5/04
[52] U.S. Cl. .................. 342/429; 342/32; 342/37; 342/433
[58] Field of Search ............ 342/429, 433, 32, 37, 342/33-35, 416, 455, 146, 367

[56] References Cited
U.S. PATENT DOCUMENTS

| | | | |
|---|---|---|---|
| 3,626,411 | 12/1971 | Litchford | 342/32 |
| 4,021,802 | 5/1977 | Litchford | 342/32 |
| 4,027,307 | 5/1977 | Litchford | 342/32 |
| 4,115,771 | 9/1978 | Litchford | 342/37 |
| 4,257,047 | 3/1981 | Lipsky | 342/434 |
| 4,319,243 | 3/1982 | Vachenauer et al. | 342/37 |
| 4,833,478 | 5/1989 | Nossen | 342/435 |

*Primary Examiner*—Gregory C. Issing
*Attorney, Agent, or Firm*—Brumbaugh, Graves, Donohue & Raymond

[57] ABSTRACT

The range from which transponder replies can be received at a virtual secondary surveillance radar of the type described in U.S. Pat. No. 4,115,771 is extended by replacing the omnidirectional antenna previously utilized to receive replies from transponders within the range of the SSR with a stationary array of a plurality of directive antennas arranged in a circle and having radiation patterns pointing in different directions from the center of and covering a respective sector of the circle, and sequentially switching on the antenna of the array covering the sector in which the rotating beam of the associated SSR is then pointing. In an arrangement in which the SSR and PSSR are so widely separated that in certain pointing directions the SSR beam overlies more than one sector of the antenna array, the antennas are sequentially switched on at calculated switching times determined from the pointing direction of the SSR beam and the times it takes in the geometrical arrangement between the SSR beam and the radiation patterns of the antennas of the array, for a given SSR interrogating pulse to propagate, from launch, along the beam until it reaches the line separating the first encountered sector from the next adjacent sector, between second and third sectors, and so on, such that a high gain directive antenna is always pointing in the proper direction to receive reply signals from a transponder intercepted by the scanning beam of the SSR.

11 Claims, 7 Drawing Sheets

PASSIVE SECONDARY SURVEILLANCE RADAR USING SIGNALS OF REMOTE SSR AND MULTIPLE ANTENNAS SWITCHED IN SYNCHRONISM WITH ROTATION OF SSR BEAM

BACKGROUND OF THE INVENTION

This invention relates to radio location, as of mobile vehicles such as aircraft equipped with transponders and, more particularly, to improvements on the inventions described in U.S. Pat. No. 4,115,771.

The system shown in U.S. Pat. No. 4,115,771, the disclosure of which is hereby incorporated herein by reference, known as a Passive Secondary Surveillance Radar (PSSR), utilizes the internationally standardized interrogation signals broadcast at a frequency of 1030 MHz by the large, rotating directional antenna of a nearby SSR, usually situated on the grounds of an airport, and the transponder signals transmitted at a second frequency of 1090 MHz by the on-board transponder of aircraft operating within the system's range, to provide accurate flight tracks, aircraft speed, altitude, vertical rates, beacon code identity, and aircraft-to-aircraft spacing, all locked to a common time base. This data is available in real time and can be stored for later evaluation.

There are hundreds of SSRs in commission in the United States, all of which transmit interlaced altitude and identity interrogations at the 1030 MHz carrier frequency, and all receive replies on the 1090 MHz carrier frequency. All ICAO nations, about 160, have also standardized on SSR. Many regions, particularly where air traffic is dense, are covered by the overlapping service areas of multiple SSR radars. An aircraft at en route altitude often responds to many radars, some as distant as 200 miles or more. Shared common carrier frequency operation of overlapping radars is made possible by assigning different beam rotation periods and different interrogation repetition patterns (rates and/or sequences) to different radars. Each radar is thus enabled to identify and process replies to its own interrogations, rejecting replies elicited by other radars. A PSSR can also segregate transponder replies associating them with individual SSRs.

The PSSR system is usually sited near but not on the airport grounds, typically a mile or two from an airport surveillance radar-SSR, and includes two antennas: a fixed, directional high gain 1030 MHz antenna aimed toward the selected SSR antenna for receiving the interrogation signals transmitted by that SSR. A 1090 MHz omnidirectional antenna is used for receiving transponder signals from nearby aircraft. A PSSR may also be associated with an Air Route Surveillance Radar (ARSR) not located on airports, but transmitting similar SSR signals for en route high altitude flights. The basic system can accurately track as many as thirty or more aircraft simultaneously in real time, and has been used in conjunction with a noise monitoring system for correlating noise events and flight tracks with aircraft identification with great accuracy, enabling a Noise Abatement Officer to respond to noise complaints, to assist in implementing noise-based restrictions, to document violations of flight corridors, and to monitor each take-off or landing operation. Multiple strategically located microphones measure noise levels of passing aircraft which are correlated with the PSSR aircraft tracks. For noise monitoring and abatement around an airport a range of about fifteen miles from the airport is acceptable and can be achieved with a simple omnidirectional antenna, consisting of little more than a dipole mounted on a flat plane, for receiving the 1090 MHz airborne transponder signals.

Among other possible applications of the PSSR system is the monitoring, by an airline's dispatch office, of its flights into a particular high-density airport so as to know the exact arrival times of its aircraft and thereby enable scheduling of gasoline trucks, food supplies, gate assignments and other significant dispatch operations essential to efficient operation and profit of that airline. Such monitoring would be done privately, independent of the Federal Aviation Administration (FAA) which, although possessing it, utilizes it for air traffic control purposes only, and normally will not provide an airline real-time, live arrival, position, identity and time data on its flights. To be useful for this purpose, however, the PSSR system must have a range of approximately fifty to one hundred miles, significantly greater than the 15-mile range of current systems. The object of the present invention is to extend the range of reception of the 1090 MHz receiving channel of the PSSR system disclosed in U.S. Pat. No. 4,115,771, by an amount to adapt it for this and other applications, without limiting the number of aircraft that can be tracked.

SUMMARY OF THE INVENTION

According to the present invention, the 1090 MHz omnidirectional antenna of the PSSR is replaced by a stationary array of directive antennas arranged in a circle and pointed in different directions such that their radiation patterns all appear to emanate from the center of the circle. For example, the array may consist of six corner reflector antennas each having a narrow pear-shaped directional radiation pattern covering an azimuthal sector of 60°, bisected by its direction axis. In response to 1030 MHz interrogation signals received from the scanning SSR antenna and based on the known distance and direction of the SSR, the PSSR continuously determines the exact pointing angle of the scanning SSR beam and locks to the rotation of the SSR beam by automatically switching on the directional antenna of the array that is pointed in the sector in which the SSR beam is then pointed. As the SSR beam leaves one sector and enters the next adjacent sector, the PSSR recognizes that the interrogating SSR beam is now pointing in a different sector and automatically switches on the directional antenna that is pointed in the next adjacent sector, and so on until completion of the scan of the SSR beam, whereupon the process is repeated. Each sector of the nearby PSSR is switched in synchronism with its associated SSR beam pointing angle. Since only aircraft within the SSR beam will be interrogated, a high gain PSSR directive antenna is always pointed in the proper direction to receive transponder reply signals, thereby extending the useful passive range of the PSSR.

In an alternative embodiment, useful in situations in which the SSR and PSSR are for one reason or another widely separated, by tens of miles for example, so as to cause the axis of the scanning SSR beam to overlie more than one sector of the PSSR antenna array when it points in certain directions, the antennas of the array are sequentially switched on at times continuously determined from the instantaneous pointing direction of the associated SSR beam, and from the geometrical relationship between the SSR and PSSR and between the rotating SSR beam and the radiation pattern of the PSSR antenna array, the time it takes for an interrogating pulse, from launch, to propagate along the narrow SSR beam before it reaches the dividing line between the first and second sectors encountered, between the second and third, and so on, such that there is a high gain directive antenna pointing in the proper direction to receive reply signals from a transponder intercepted by the scanning interrogating beam of the SSR.

Other objects, features and advantages of the will become apparent, and its construction and operation better understood, from the following detailed description when read in conjunction with the accompanying drawings.

DESCRIPTION OF THE PREFERRED EMBODIMENTS

Figure 1:
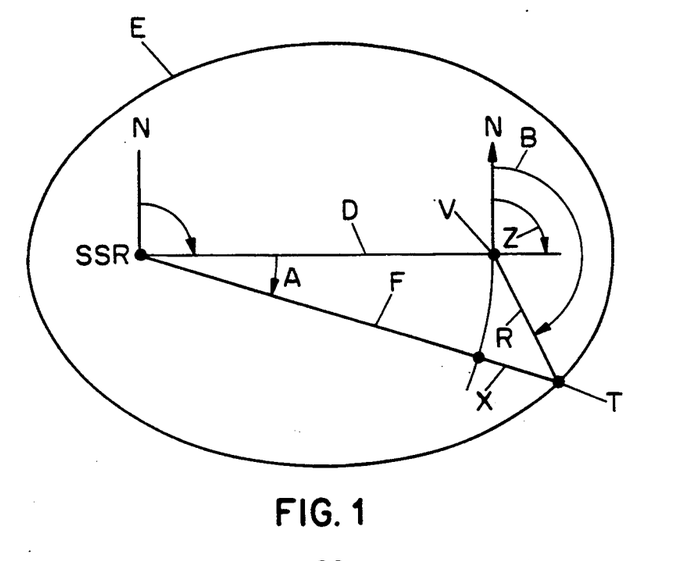
FIG. 1 is a geometrical diagram used in explaining the operation of the PSSR system disclosed in U.S. Pat. No. 4,115,771.

Referring to FIG. 1, the system described in U.S. Pat. No. 4,115,771 simulates at a location V service essentially equivalent to that of a local SSR located at a distance D by receiving the interrogation from and transponder replies to the actual SSR. The position of a transponder-equipped aircraft in the general neighborhood of V, the location of the PSSR, is represented by T; R is the range and B is the bearing from V to T; A is the differential azimuth and X is the differential range between V and T from the SSR. The time relationships between the received signals and the known distance D and direction Z of the SSR provide all the information necessary to display the position of the transponder relative to a reference location, such as that of a small airport located some distance from the SSR or of a location near to but off the grounds of a major airport.

In the operation of the system of FIG. 1, the airborne transponder produces a reply trigger pulse in response to each interrogation pulse pair received as the scanning radar beam sweeps past the aircraft. The standard interrogation consists of two half-microsecond pulses P1 and P3 separated by specified intervals on a 1030 MHz carrier; a pulse separation of 8 [sec. (known as mode A) interrogates the identity of the aircraft and a pulse separation of 21 μsec. (mode C) interrogates its altitude. A series of about twenty such pulse pairs is received during each sweep, at intervals of 2 to 5 milliseconds. Each reply trigger pulse initiates a reply transmission from the transponder on a 1090 MHz carrier.

The reply includes an initial pulse and another pulse, called a framing pulse, that follows it by 20.3 μsec. The interval between each pair of framing pulses contains a number of discrete subintervals, in each of which a pulse may or may not be transmitted, depending upon what information is to be contained in the reply. Twelve such subintervals are available, allowing for possibility of any of 4,096 different binary code groups, each representing one or more pieces of information such as identity, barometric altitude, distress signal, and so on. The desired reply code group may be set in by the operator of the craft, or in some cases automatically or semiautomatically, as by pressing a button. As has been indicated previously, a reply code group representing identity is automatically transmitted in response to P1 and P3 interrogation pulses separated by 8 μsec. and a reply code group representing altitude is sent in reply to interrogation pulses separated by 21 μsec.

While the foregoing description provides background adequate for an understanding of the present invention, a more detailed description can be found in U.S. Pat. No. 3,626,411 entitled "Proximity Indicator Systems Using Transponders".

The time between reception at V of an interrogation and reception of a transponder reply thereto establishes the position of that transponder T as being somewhere on a specific ellipse E having one focus at the SSR and the other focus at the receiver location, namely, at V. The time between pointing of the SSR main beam axis (which rotates clockwise) at the transponder T and at the receiver location V is a measure of the azimuthal angle between them from the SSR, which establishes the point on the ellipse E of the position of the transponder T. The plan positions of transponder-equipped aircraft present in the vicinity of the receiver location V, which are completely determinable from the known quantities D and Z, the measured quantities A and the time interval t between each transponder reply and the corresponding interrogation from the SSR received at V, may be displayed in terms of elliptical and SSR radial coordinates, but preferably are displayed in polar coordinates centered on the receiver location. Heretofore, a directional antenna has been utilized to receive the interrogations from the SSR and a low gain omnidirectional antenna has been used to receive the 1090 MHz transponder replies. The limited gain of the omnidirectional antenna has limited the useful range and coverage of the system to about fifteen miles, too short for certain important applications.

Figure 2:
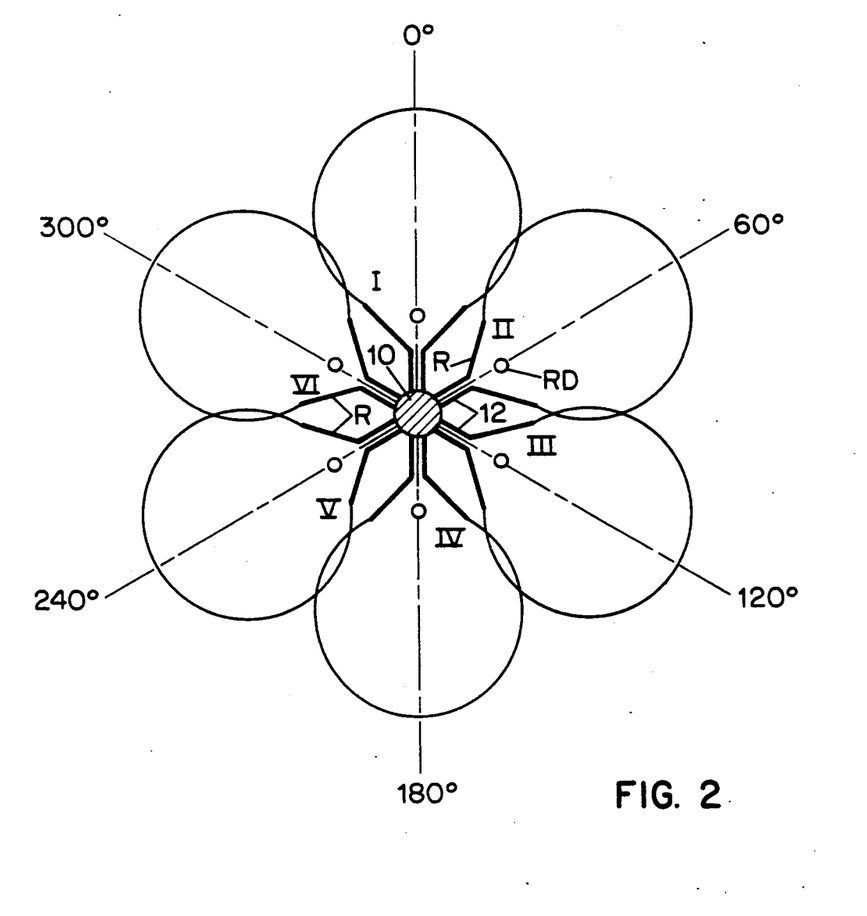
FIG. 2 is a top plan view of an array of directional antennas and their radiation patterns.
Figure 9:
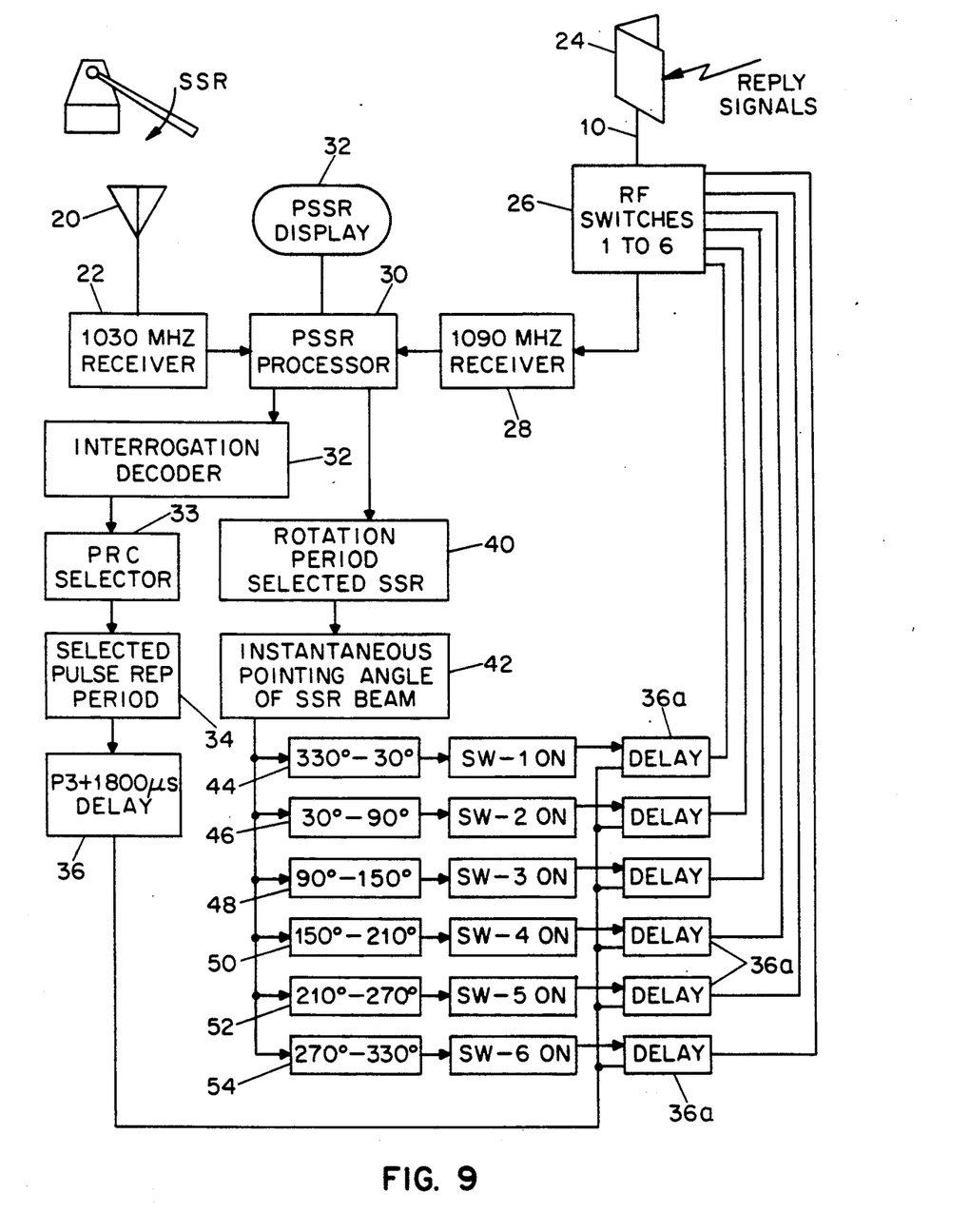
FIG. 9 is a block diagram showing a first embodiment of the invention.

According to the present invention, the sensitivity and range of reception of the 1090 MHz channel of the PSSR is extended to sixty or more miles by replacing the usual 1090 MHz omnidirectional antenna with an array of multiple directive antennas, typically six or eight in number, arranged to point in different directions from the center of a circle, and sequentially switching on the individual antennas in synchronism with the rotation of the scanning SSR antenna. FIG. 2 is a plan view of an array of six antennas uniformly distributed around a circle and mechanically supported on a vertically-oriented mast 10 by respective support arms 12. Each of the antennas, numbered I through VI, may be a relatively simple and inexpensive corner reflector antenna comprising a reflector R and a dipole radiator DR so oriented with respect to its support arm 12 that the pointing axis of its generally pear-shaped radiation pattern is coincident with the axis of the support arm. The pointing axes of adjacent radiation patterns are displaced from each other by 60° and the patterns overlap at their 3dB points. Switching means, not shown in FIG. 2 but to be described later in connection with FIG. 9, are supported on the mast, closely adjacent to the antenna elements, for switching the individual antennas on and off sequentially in a clockwise direction.

Figure 3:
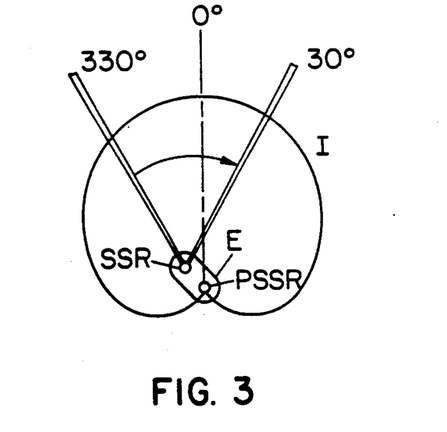
FIGS. 3 to 8 are geometrical diagrams used in explaining the operation of a first embodiment of the invention.

How and when the individual antennas are switched on and then off will be seen from FIGS. 3 through 8, each of which depicts two rotational positions of the scanning beam of an SSR radar, the location of the SSR relative to the PSSR and the radiation pattern of a different one of the six antenna elements comprising the array shown in FIG. 2. In FIG. 3, the SSR beam, which typically has an angular width of 3°, is shown as rotating clockwise from an instantaneous pointing angle of 330° through an angle of 60° to a position where the pointing angle is at 30°; the rotation period of the SSR beam typically being 4800 milliseconds, it is seen that it takes 800 milliseconds for the beam to rotate from the 330° position to the 30° position. These two positions of the SSR beam are shown superimposed on the pear-shaped radiation pattern of antenna I of the PSSR array, the site of which is displaced from the SSR, which has a pointing direction of 0°; thus, the scanning beam passes through the high-gain portion of the fixed radiation pattern of antenna I, and if antenna I is on it will receive the reply from the transponder of any aircraft that may be within the 60°-sector interrogated by the scanning SSR beam. Because the exact location of the SSR, the rotation period of its antenna and its pulse repetition characteristics are known, and are continuously measured by the PSSR, the PSSR can accurately identify any targets that may be within the broad sector-shaped pattern.

Figure 4:
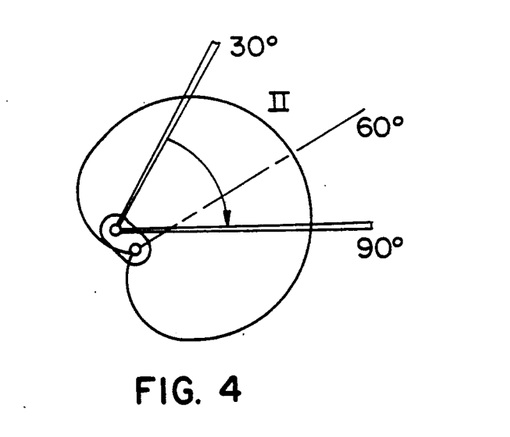

When the scanning beam of the SSR reaches the 30° pointing direction, PSSR antenna I is switched off and antenna II, which as shown in FIG. 4 has a pointing direction of 60°, is switched on (by means to be described presently) such that as the SSR beam rotates through the next 60° sector from 30° to 90° it passes through the high-gain portion of its radiation pattern. Consequently, the antenna II enables the PSSR to detect, identify and track any targets that may appear within the extended range of its radiation pattern.

Because switching of the 1090 MHz signals transmitted by the SSR can take place in 0.5 μsec., it is possible to utilize these signals synchronized to the SSR beam to switch from one directional antenna of the PSSR array to the next substantially instantaneously with no loss of data as the SSR scanning beam enters a new 60°-sector. The distance D between the foci of the ellipse E, the azimuth angle A with reference to the line between the PSSR and the SSR, and the exact time of arrival at the PSSR of the SSR interrogating signal and reply signals from all targets within the SSR beam being known, and since an useful range of about one hundred or more miles for aircraft at elevation angles above about 1.0° is the objective, the P3 pulses of the SSR beam, delayed by say 1800 μsec., which is equivalent to 150 miles (a 2-way radar signal takes 12 μsec. to travel one mile) are used to initiate switching. This insures that switching from one PSSR antenna to the next will occur when any targets that may be present at great distances (beyond 100 miles) would be responding, and that there would be no switching between antennas for targets present in the range from zero to 150 miles thereby to preclude interruption of the tracks of closer in targets. An implementation of a system for effecting switching from one antenna to the next at precisely the correct time is shown in FIG. 9 and will be described presently.

Figure 5:
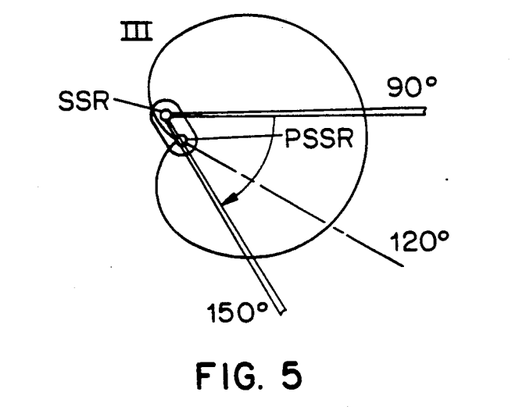
Figure 6:
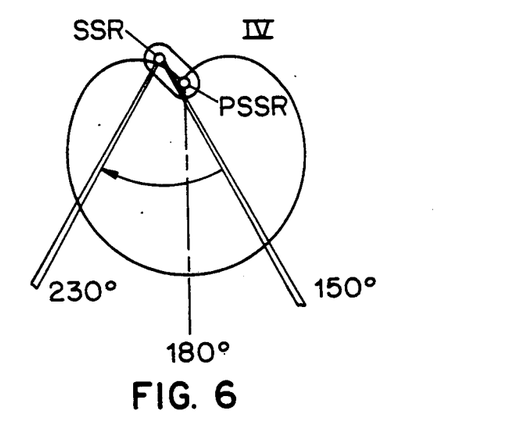
Figure 7:
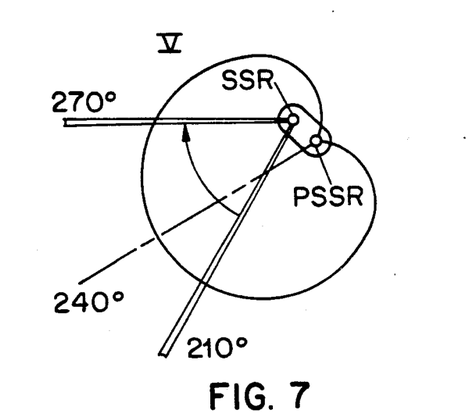
Figure 8:
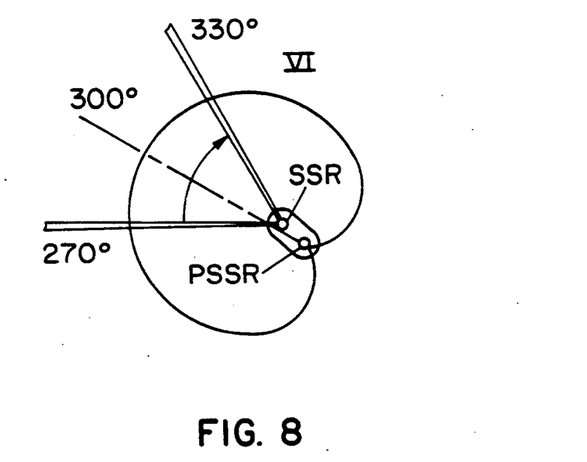

Continuing the sequence, FIG. 5 depicts the instantaneous pointing angles of the SSR beam at the beginning and end of the period required to scan a 60°-sector between 90° and 120° superimposed on the radiation pattern of antenna III, the directivity axis of which points to 120°. In FIG. 6, antenna IV when switched on covers a scan sector of the scanning beam from 150° to 210°, and because its directivity axis essentially bisects the scan sector the radiation pattern is wider than the sector and thereby provides enhanced gain throughout the sector. Conditions are slightly less favorable when antenna V is switched on by rotation of the SSR beam from 210° to 230° because, as seen in FIG. 7, the scanning sector is rather unsymmetrical with respect to the 240° pointing direction of the fixed antenna. However, the antenna provides sufficient gain throughout the sector to enable it to reliably receive transponder replies from aircraft within the sector at distances of one hundred or more miles. As seen in FIG. 8, when antenna VI is switched on by the scanning beam entering the 270° to 330° sector, the scanned sector is again more symmetrical with respect to the direction axis of the stationary antenna. When the scanning beam reaches the 330° pointing direction, which occurs 4800 milliseconds after the starting position depicted in FIG. 3, the described cycle is repeated Referring now to FIG. 9, which is a block diagram of apparatus at the PSSR for effecting sequential switching of the fixed antennas in synchronism with rotation of the SSR antenna, an antenna 20 receives 1030 MHz interrogating signals from the nearby SSR radar, typically one to three miles away from the PSSR site, and couples it to a 1030 MHz receiver 22. Reply signals from transponders within the range of the SSR are at any instant received by only one of the six directional antennas of the array shown in FIG. 2, shown at 24, and coupled through a switch 26 to a 1090 MHz receiver 28. A six-position RF switch 26 is supported on mast 10 in close proximity to the antenna elements, the one being closed at any instant determining which of the six antennas is delivering a transponder reply signal to receiver 28. Signals received by receivers 22 and 28 are applied to a PSSR processor 30 constructed in accordance with FIG. 1 of U.S. Pat. No. 4,115,771, which determines the time relationships between the received interrogations and reply signals and provides the information necessary to display on a PSSR display 32 the positions of one or more transponders relative to the site of the PSSR, preferably in polar coordinates centered on the site.

The processor 30 includes an interrogation decoder 32 and a pulse repetition characteristic (PRC) selector 33 which determines whether the interrogation mode is A or C and the precise timing of each P3 pulse of the interrogating pair that is propagated along the narrow beam of the SSR radar. A generator 34 produces pulses in synchronism with the interrogations from the SSR when they are received and continue to do so while they are not. A delay of 1800 μsec. is added in block 36 to the timing of the P3 pulses of the SSR radar to insure that switching from one to the next directional receiving antenna occurs only when any targets present are beyond 150 miles, that is, during a "dead time" in a system intended to cover a range of only 100 miles; block 36 is intended to represent that switching cannot occur during reception periods from transponders present within a range of less than 100 miles, and introduces delay 36a in each of the switching paths to insure that targets in the 0—00 mile range are not disturbed.

Also available from PSSR processor 30 is data concerning the rotation period of the scanning beam of the SSR, represented by block 40, from which the instantaneous pointing angle of the beam (block 42) is readily calculated. It being known that if the beam rotates once every four seconds, for example, the rotation period can be measured to an accuracy of one millisecond and the pointing angle determined to an accuracy of ¼°. This pointing angle information is applied to the inputs of six switching signal generators 44, 46, 48, 50, 52 and 54, each of which is operative to produce a switching signal during the period required for the SSR beam to scan through a respective 60° sector. For example, signal generator 44 produces a switching signal which turns switch SW-I "ON" when the instantaneous pointing angle of the SSR beam is 330° and turns SW-1 "OFF" when the pointing angle is 30°. Switch SW-1 is closed during the 800 millisecond period required for the SSR beam to transverse this 60° sector and connects antenna I of the array (FIG. 2) to the 1090 MHz. receiver. Antenna I remains connected to the receiver until the SSR beam points in the 30° direction, whereupon switch SW-1 is turned "OFF" and switch SW-2 is turned "ON" and connects antenna II to receiver 28, and so on, until the SSR beam has rotated through 360° and the cycle is repeated. Switching occurs using the PRC synchronization when the P3 pulse has traversed to the maximum range to avoid disturbing target data. Only one switch is closed at any instant of time so that, in effect, the multiple 1090 MHz receiving beams follow the rotating SSR beam in synchronous stepwise fashion so as to provide, at low cost, additional gain and range coverage for the PSSR as compared to the prior art system.

The extended range objective is readily achieved with corner reflector antennas which are relatively inexpensive and simple to fabricate and install, and can typically have a gain of 10-15 db, more than adequate to extend the range of the array up to 100 miles at jet aircraft altitudes in all directions, and can be constructed with a large vertical aperture so as to have considerable vertical gain.

While the described array has six directive antennas all having the same radiation pattern, it is to be understood that an array of a smaller or larger number of antenna elements may be used, or some of the elements in the array may have different gains and/or radiation patterns for accommodating the array to a particular geographical environment, without departing from the inventive concept of switching the antennas on and off in synchronism with the rotation of the SSR beam.

It will have become apparent from the foregoing system description, in which the SSR and PSSR are separated by a relatively small distance, typically about one to two miles, the scanning SSR beam stays inside the radiation pattern of an antenna covering a given sector so that switching from one antenna to the next adjacent antenna can be done in angular synchronism with SSR beam rotation. However, when it is necessary to separate the PSSR from the SSR by greater distances, say tens of miles, synchronous switching of a stationary antenna array at the PSSR can result in the loss of targets within the SSR beam because the total SSR beam out to a range of 100 miles often does not lie only within one antenna sector. The interrelationship of the scanning SSR beam and the radiation pattern of a stationary antenna array at a distant PSSR is graphically illustrated in FIGS. 10A, 10B 10C and 10D which together show the rotation of the SSR beam in angular steps with respect to the directivity axes of a stationary array of eight separate directive antennas. In all of these figures, 45°-sectors numbered 1 through 8 centered at and distributed around the PSSR site, represent the reception patterns of the eight separate antennas with beams about 45° wide at −3 db, and in each figure the scanning SSR beam is shown increasingly angularly displaced from the line of sight between the SSR and PSSR, the four positions being represented by a solid line, a dotted line, a dot-dash line and a dashed line, in that order. Going from figure to figure, the four positions of the SSR beam are represented by the first fourteen letters of the alphabet: A through D in FIG. 10A; E through H in FIG. 10b; I through L in FIG. 10C; and M and N in FIG. 10D.

Figure 10A:
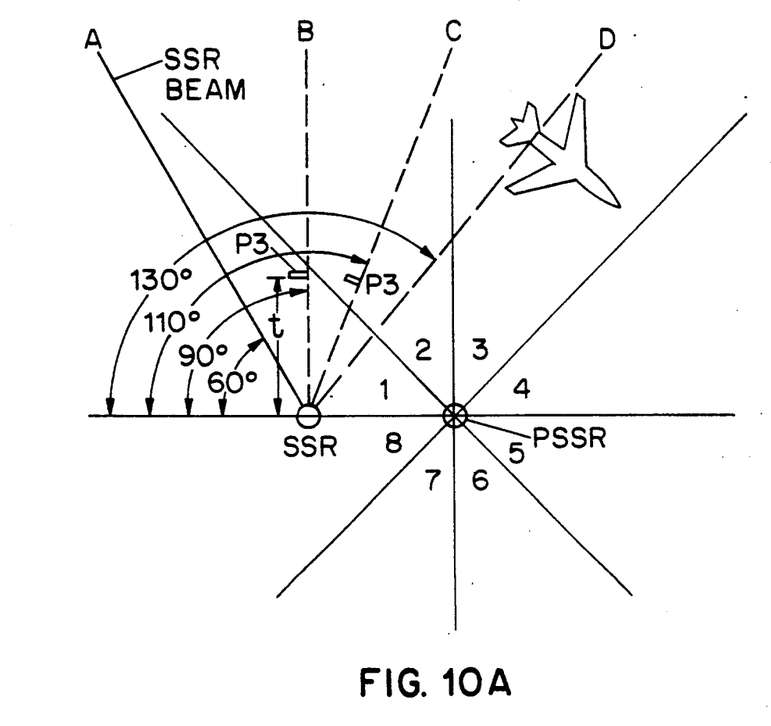
FIGS. 10A to 10D and FIG. 11 are geometrical diagrams used in explaining the operation of a second embodiment of the invention.

Referring to FIG. 10A, to reach position A the SSR beam has scanned through an angle of 60° from the line of sight connecting the SSR and the PSSR, which will be treated as a 0° reference position in the discussion to follow. When in position A, the SSR beam, which is about 3° to 4° wide, lies entirely within the 45° reception sector of antenna #1. As the beam is scanned to position B, which is about 90° from the 0° reference, if the overall length of the dotted line is assumed to be about 140 miles, and remembering that the P3 pulses emanating from the SSR propagate along the beam at the speed of light so as to travel a nautical mile in about 6 μsec., the elapsed time t for a P3 pulse to arrive at the position shown represents about 70 nautical miles and the space between the two P3 pulses shown alongside the dotted line would extend from 70 to 140 miles. It is seen that when in position B the SSR beam lies within the reception sector of antenna #1 out to a range of about 70 miles, and overlies the reception sector of antenna #2 over its 70 to 140 miles range. Thus, to track and not lose the targets, antenna #1 must be switched off and antenna #2 switched on at the instant that the SSR beam enters the reception sector of antenna #2; the precise switching time is determinable from the time of propagation of the P3 pulse from the SSR to the trailing edge of sector 1, which in the present example is about 70 mi ×6 μsec. =420 [sec. The processor at the PSSR, knowing the time the P3 pulse was launched from the SSR, and the instantaneous pointing direction of the beam relative to the 0° reference, determines that antenna #1 should remain on for 420 μsec. and then instantly switch to antenna #2 for the next 600 μsec. or so (total of 1040 μsec. or more from the time a P3 pulse is launched from the SSR) to enable it to receive replies from transponders within sector 2 out to a range of about 175 miles. Bearing in mind that the SSR beam is about 3° wide and rotates through 360° in about four seconds, the beam "dwells" on an aircraft for about 1% of the rotation period, or about 50 milliseconds, during which time the SSR transmits about twenty P3 pulses, each separated by about 2500 μsec in a burst. An aircraft transponder replies to each P1-P3 pair, or about twenty times within the burst.

It will be noted that as the SSR beam is scanned an additional 20° to position C it passes from sector #1 to sector #2 at a shorter range than when it was in position B, say at about 50 miles instead of about 70 miles, but as in position B stays within sector #2 out to its maximum range. Therefore, the pSSR must switch from antenna #1 to antenna #2 when the P3 pulse has traversed 50 miles, or about 300 μsec. following launch of a given P3 pulse from the SSR. It will now be evident that the time at which antenna #2 is switched on is a continuously variable function of the pointing angle of the SSR beam, which is known to the PSR in great detail and its geographical relationship with the reception sectors of the antennas array. Knowing the pointing information, the SSR's pulse repetition period and its relationship with the sectors and the distance between the SSR and the PSSR, the system can by straightforward geometrical calculation readily determine how many reception sectors the SSR beam overlies at any instantaneous angular position.

After rotation to position D, at which the pointing angle is 130°, the narrow SSR beam extends across the reception sectors of antennas #1, #2 and #3, and a P3 pulse launched from the SSR travels only about 40 miles (240 μsec. from launch) before arriving at the leading edge of sector #2, then antenna #2 is switched on. At this time antenna #2 "listens" for targets that may be intercepted by the SSR beam within a range from about 40 miles to about 110 miles (i.e., an additional 70 miles) at which time the beam enters the reception pattern of antenna #3 and antenna #3 is then turned on. Thus, antenna #2 is on for the period between 240 μsec. and 660 μsec., whereupon antenna #3 is switched on and continues to "listen" on out to 1800 μsec., or to the maximum range of interest.

Figure 10B:
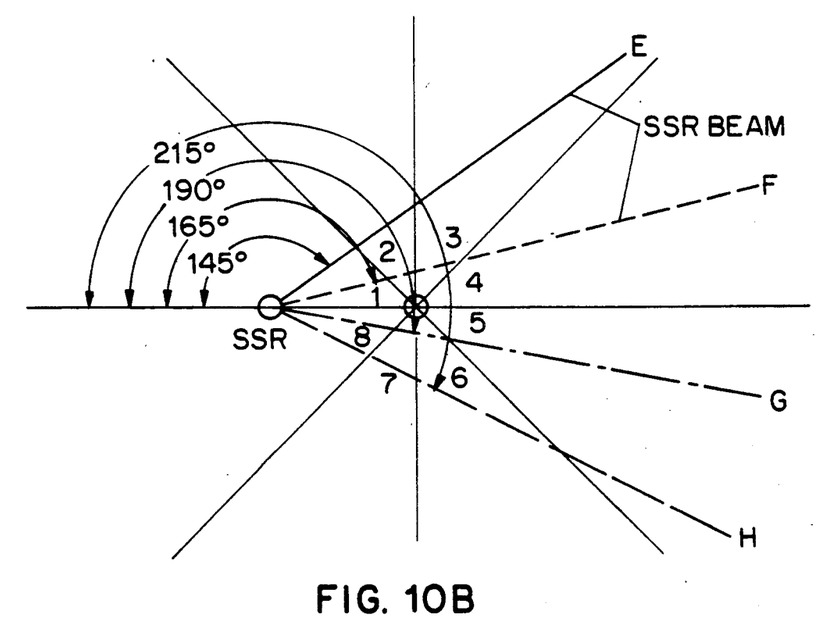

Turning now to FIG. 10B, the SSR beam at position E points at 145° and overlies antenna sectors 1, 2 and 3 and would enter sector 4 beyond the range of interest. Therefore, antenna #3 will not be switched off because its directivity axis is aimed generally in the same direction as the current pointing angle of the beam.

When the beam is moved to position F (pointing angle of 165°), it extends across adjacent reception sectors of four of the eight antennas which comprise the PSSR array. If, for example, three aircraft were simultaneously present in the beam, a first at 20 miles from the SSR, a second at about 50 miles and a third at about 90 miles, the reply from the first would be received by antenna #1 since the transition from sector 1 to sector 2 occurs at about 30 miles (180 μsec.) from the SSR, the reply from the second would be received by antenna #3, the reception pattern of which straddles a time period along the beam from 240 μsec. to 360 μsec. (i.e., 40 to 60 miles), and the reply from the third would be received by antenna #4, the reception sector of which is oriented with respect to the beam to receive signals during the time period along the beam from 360 μsec. to say 1800 μsec., namely, from 60 miles out to the maximum range of interest. Thus, from the time a P3 pulse leaves the SSR each of four antennas has at some period of time been switched on, at times determined by the rate of propagation of the P3 pulse along the beam through sector 1 to sector 2, to sector 3 and to sector 4, thereby to reliably receive at the PSSR replies from all targets interrogated by the beam. The exact switching time can be varied slightly (e.g., ±25 μsec) scan-to-scan to avoid any loss of targets even in narrow vectors that might be lost due to consistent switching times.

Scanning the SSR beam through 190° to position G results in a situation that is the mirror image of that which obtains when in the just-described position F, in that antenna #8 is switched on first, antenna #7 next, then antenna #6 and finally antenna #5. Similarly, in position H (215° the beam overlies four sectors and antennas 8, 7, 6 and 5 are switched on and off in the same sequence.

Figure 10C:
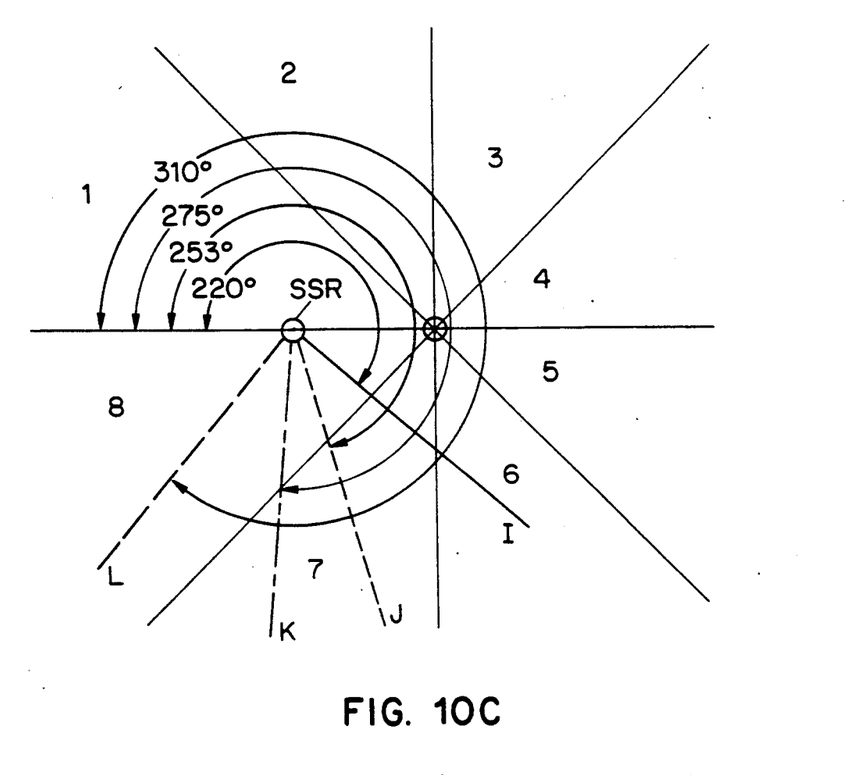

Referring now to FIG. 10C, the beam is shown rotated by 220° from the reference to position I at which only antennas 8, 7 and 6 need to be switched since the beam is essentially coincident with the pointing direction o antenna #6. Upon further rotation, by an additional 33° to position J, the beam overlies only sectors 8 and 7 so as to require switching of only two antennas. Positions K and L, at 275° and 310°, are essentially the complements of the positions B and C, respectively, shown in FIG. 10A. Position K requires switching from antenna 8 to antenna 7, but in position L only antenna 8 will be switched o because the beam is substantially parallel with the pointing axis of the stationary antenna.

Figure 10D:
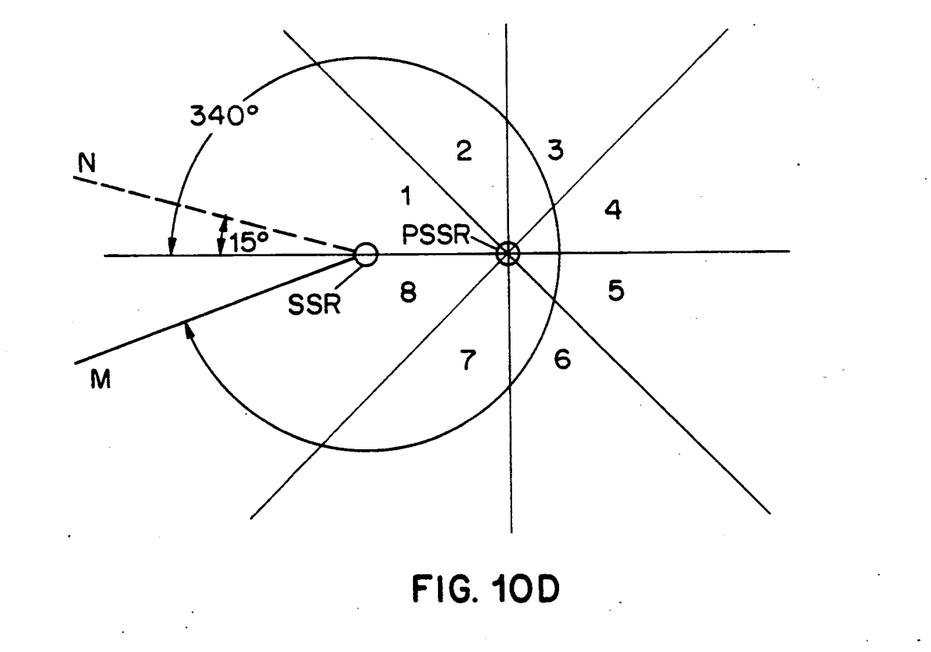

FIG. 10D shows the beam at 340° (position M), where it lies only in sector 8, and at 15° (position N) where it lies only in sector 1. Interestingly, because of the relative geographical displacement of the PSSR and SSR only antenna #8 is used throughout the approximately 50° scanning arc between 310° and 360°.

Figure 11:
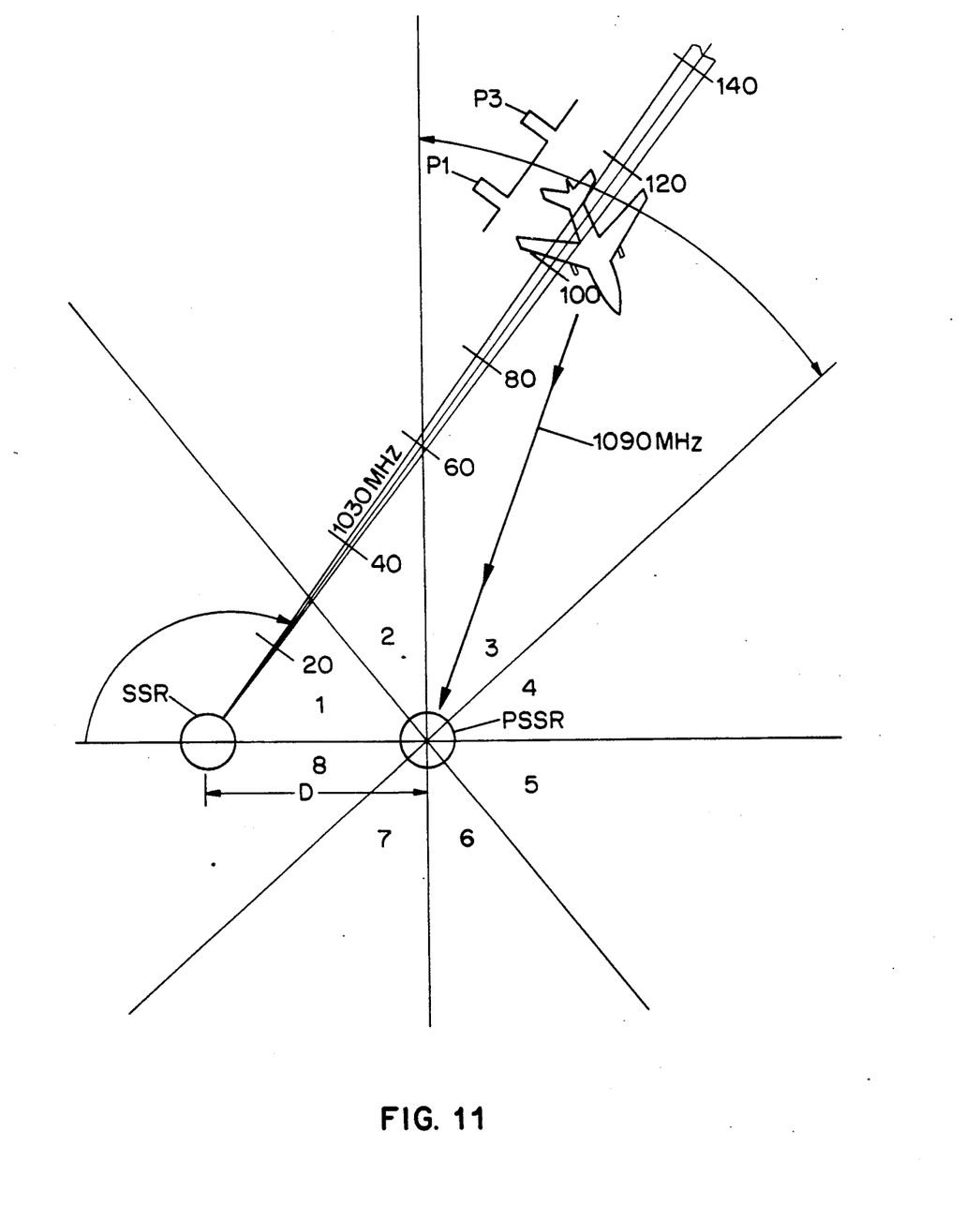

The principles of operation of the invention will now be summarized with reference to FIG. 11 which shows the SSR beam at a position corresponding to position D in FIG. 10A, that is, pointing at 130°, so that a P3 pulse propagating from the SSR along the narrow SSR beam at the speed of light first traverses sector 1, then sector 2, and then sector 3 in which it intercepts and interrogates an aircraft 60. The transponder in the aircraft in reply downlinks its response to the PSSR on a 1090 MHz carrier, giving altitude, identity and other information in reply to the P3, specifically the P1-P3 timing of the P1 and P3 pulses an interrogation. In civil aviation only P1-P3 spacings of 21 μsec., to which the reply is altitude, and 21 μsec., to which the reply is identity of the interrogated aircraft, are used. As previously discussed, the PSSR measures time of arrival (TOA), that is, the time it takes for a P3 pulse also used at the PSSR to traverse the 1030 MHz path to trigger the aircraft's transponder, and the transponder's reply signal to be received at the PSSR over the 1090 MHz. channel. The PSSR measures target TOAs regardless of which of the eight sector antennas receives the 1090 MHg transmission from the target.

Using a scale different from that used in FIG. 10A to better illustrate the principles of operation, the SSR beam shown in FIG. 11 is divided into 20 mile long (120 μsec.) segments and is shown as having a range of 140 miles. A P3 pulse launched from the SSR and propagating along the beam initially turns on antenna #1 and at about 30 miles (180 μsec.), that antenna is then turned off and antenna #2 is switched on for the time period along the beam from 180 μsec. to 360 μsec. (30 miles to 60 miles), following which antenna #3 is switched on for the time period along the beam from 360 μsec. up 840 μsec. (in this example) or 60 miles to 140 miles. It is to be understood that the indicated scaling and timing are illustrative of the principles of the invention and are not intended to be exact or limiting.

The ASR-SSR beam scans clockwise, typically making one revolution every four seconds; accordingly, the beam scans through each 45° sector representing the radiation pattern of a respective stationary antenna of the PSSR array in 500 milliseconds. The exact pointing angle of the beam is at all times known to the PSSR, as is the PRP of the SSR radar, so that the "start time" of P3 is available for use in calculating the times at which switching between antennas must occur. Assuming for purposes of this discussion that the distance D between the PSSR and the SSR is 30 miles, or 180 μsec. pulse transmission time, by looking at successive patterns of the P3 timing of the SSR, the PRP pattern can be precisely established in the computer memory of the PSSR processor. In order that the pattern stored in the PSSR have precisely the same "start time" as the SSR, a "pre-trigger" is provided at the SSR to take into account the transit time of the P3 pulses from the SSR to the PSSR, in this example, 180 μsec. That is to say, the pre-trigger at the PSSR occurs 180 μsec. prior to the actual launch of the P3 pulse by the SSR. The pre-trigger time is calculated in computer software at the PSSR for every pulse repetition pattern of the SSR. A typical pulse repetition period of 400 P3 pulses per second, and a beam rotation period of 4 seconds, means that 1600 PRPs occur and 1600 calculations of the pre-trigger take place during each rotation of the beam. The continuously changing switching times relative to the time of launch of the P3 pulse from the SSR, as determined at the PSSR, was seen in FIGS. 10A through 10D.

Figure 12:
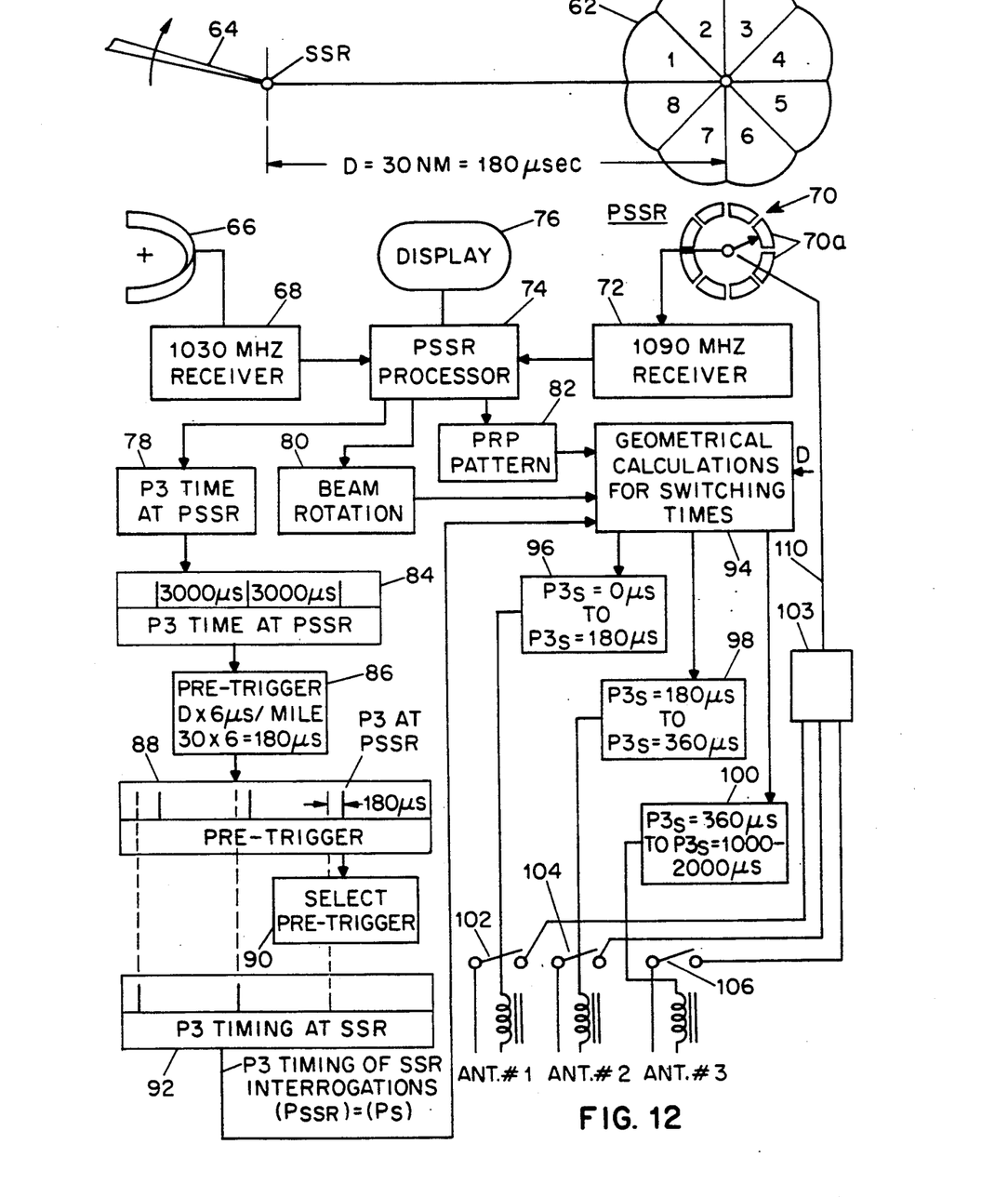
FIG. 12 is a block diagram showing a second embodiment of the invention.

FIG. 12 is a functional block diagram of PSSR apparatus for describing sequential switching of three of the eight individual antennas of an array 62 installed at a PSSR site in synchronism with the rotation of the narrow beam 64 of an SSR located 30 miles along a line of sight (LOS) from the SSR and the beam position shown in FIG. 11. A directional very high gain antenna 66, pointed toward the SSR, receives interrogating pulses on a 1030 MHz carrier and couples them to a 1030 MHz receiver 68. Reply signals from the transponders within the range of the SSR are received by one of the eight antennas of array 62, each of which may be a corner reflector having a narrow sector-shaped radiation pattern. Which antenna of the array at any given instant receives the reply signal is determined by an RF switch, diagrammatically shown as a rotary switch 70, the stationary contacts 70a of which are each connected to the di-pole (or other radiator) of a respective corner reflector antenna, and capable of being sequentially switched within a microsecond. The antenna array 62 and the switch 70 are mounted together on a mast (not shown) in close proximity to each other to minimize signal delay, the mast being sufficiently high to provide a clear line of sight to all potential targets. Any delays are corrected in the software of the processor. The reply signals received by the instantaneously operative antenna are coupled through the switch to a 1090 MHz receiver 72. Signals received by receivers 68 and 72 are processed in a PSSR processor 74 in the manner taught in U.S. Pat. No. 4,115,771 so as to present on a display 76, preferably in polar coordinates, the positions of one or more transponders relative to the PSSR site.

Included in the information processed by and available from processor 74 are: the time of the P3 pulse as decoded or created, represented by block 78; rotational position of an SSR beam having (for example) a rotation period of seconds, represented by block 80; and the PRP pattern of the SSR, which may be fixed or staggered, represented by block 82. The P3 timing of the SSR, as measured at the PSSR, is shown in block 84 as three pulses separated by exactly 3000 μsec., assuming a fixed 3000 μsec pulse repetition period as an example. A pre-trigger time of 180 μsec., corresponding to the 30-mile separation between the SSR and the PSRR and represented by block 86, is generated for each P3 pulse so as to provide the pattern shown in block 88, wherein a pre-trigger precedes each P3 pulse by 180 μsec. As shown by block 90, the pre-trigger time is selected so as to provide at the PSSR the P3 timing of the SSR, as indicated in block 92. In other words, the PSSR knows in computer clock time when a P3 pulse left the SSR for propagation along its narrow scanning beam 64. This timing information, together with beam rotation information from block 80 and PRP pattern information from block 82, is used to calculate the times of switching from one stationary antenna to the next in the sequence described in connection with FIGS. 10A through 10D. This calculation, performed by software of the PSSR computer represented by block 94 labeled "GEOMETRIC CALCULATIONS FOR SWITCHING TIMES", for the specific conditions shown in FIG. 11, provide three adjacent time measurements reckoned from the instant that the P3 pulse is launched from the SSR: from 0 to 180 μsec, represented by block 96, the time it takes the P3 pulse to traverse sector #1 in FIG. 11; from 180 μsec. to 360 μsec., the time it takes the P3 pulse to traverse sector #2 in FIG. 11 (block 98); and from 360 μsec. to 1000 μsec. or more (block 100), the time it takes the P3 pulse to traverse sector #3 and out to the range of interest. These are the maximum periods for the P3 pulse to traverse the sectors and vary with the pointing angle of the SSR beam 64, as previously discussed.

The timing unit 96 produces an output at t=0, i.e., the instant the P3 pulse is launched from the SSR, which actuates a switch schematically shown at 102 which, in turn, actuates the switch 70 to turn antenna #1 on and keep it on for the 180 μsec. required for the P3 pulse to traverse sector #1 (FIG. 11), whereupon switch 102 is opened, antenna #1 is turned off, and timing unit 98 produces an output which closes a switch 104, which activates rotary switch 70 to turn antenna #2 on for the 180 μsec. period needed for the pulse to traverse sector 2. Following the elapse of 360 μsec. switch 2 is opened to turn antenna #2 off, and an output from timing unit 100 closes a switch 106 which, via line 110, actuates RF switch 70 to switch antenna #3 on.

Thus, the individual antennas of the array 62 are sequentially switched, automatically, as a function of the rotational position of the SSR beam, the distance D and the number of antennas in the array, thereby to assure optimum reception at the PSSR of reply signals from any aircraft interrogated by the rotating beam in all pointing directions.

While the principles of the invention have been described in the context of two different arrangements of the PSSR relative to the SSR, relatively close to each other in one and separated by tens of miles in the other, with different arrays of antennas, an array of six in the one and an array of eight in the other, and with certain timing relationships assumed, it will be understood that these examples are intended to be illustrative only and should not be regarded as limiting. It will now occur to those skilled in the art that the implementation of the invention can be modified in numerous ways without departing from its basic concepts. Therefore, the invention is not deemed to be limited except a defined by the appended claims.

We claim:

1. Apparatus for extending the operational range of a system for indicating the position of a transponder with respect to a reference position at a known location within the service area scanned by the rotating beam of a secondary surveillance radar (SSR) by receiving with a first receiver at said reference position interrogations from said SSR and receiving with a second receiver at said reference position replies from the transponder elicited by said interrogations and determining the position of the transponder from the time relationship between said received interrogations and replies elicited thereby and the scanning period of said rotating beam, said apparatus comprising, at said reference position:

a multiplicity of directive antennas arranged in a stationary circular array and having directive radiation patterns pointing in different directions from the center of said array, each said pattern covering a respective sector of a circle, and means including switching means responsive to the rotational position of said rotating SSR beam for sequentially coupling to said second receiver the antenna of said array whose radiation pattern is pointed to the sector in which the rotating beam is then pointing, thereby to increase the gain of reply signals received by said second receiver and correspondingly extend the range from which transponder replies can be received at said reference position.

2. Apparatus according to claim 1, which includes at said reference location processor means for processing information received by said first and second receivers for determining the position of a transponder with respect to said reference position; and wherein said switching means comprises:

(a) a multiplicity of RF switches, one for each said antenna, connected to said stationary array, each when actuated coupling a respective antenna to said second receiver;

(b) means including said processor means for determining the instantaneous pointing angle of said rotating SSR beam, and (c) means responsive to the instantaneous pointing angle of said SSR beam for actuating said RF switches sequentially in synchronism with the rotation of said SSR beam.

3. A system according to claim 1, wherein each antenna of said array is a corner reflector antenna having a directive pear-shaped radiation pattern.

4. A system according to claim 2, wherein each antenna of said array is a corner reflector antenna having a directive pear-shaped radiation pattern.

5. A system according to claim 2, wherein said means for actuating includes delay means for delaying actuation of each of said RF switches by a predetermined time interval following transition of the pointing angle of said SSR beam from the sector in which it was last pointed to the next adjacent sector for preventing disturbance of replies from a transponder which may be positioned on an imaginary line separating said sectors within a predetermined range from said SSR.

6. A system according to claim 5, wherein the duration of said predetermined time interval is the time it takes a given interrogation pulse to traverse said predetermined range.

7. A system according to claim 5, wherein said means for actuating includes separate delay means for each of said plurality of RF switches and further includes separate means in combination with each of said delay means for turning a respective RF switch on and off at the beginning and end, respectively, of the time interval required for said SSR beam to scan through a respective sector.

8. A system according to claim 1, wherein said SSR is spaced from said reference position by an extended distance which causes said rotating SSR beam, at certain pointing angles, to overlie two or more of said sectors, and wherein said means for sequentially switching further comprises means responsive to the pulse repetition pattern of interrogations received from said SSR and the instantaneous pointing direction of said rotating SSR beam for calculating switching times based on the times it takes in the geometrical arrangement between the SSR beam and the radiation patterns of the antennas of said stationary array for a given SSR interrogation pulse, from launch from said SSR propagating along said beam to reach a first imaginary line separating a sector first entered by said pulse from its next adjacent sector, to traverse a distance along said beam from said first imaginary line to a second imaginary line separating said next-adjacent sector from its next-adjacent sector, and so on, and at such calculated switching times, switching on the antenna of said stationary array that covers the sector that said given interrogation pulse is then entering.

9. A system according to claim 8, which includes at said reference location, a first receiver for receiving interrogations from said SSR, a second receiver for receiving replies from a transponder, and a processor for processing information received by said first and second receivers, and wherein said means for sequentially switching further comprises:

a plurality of RF switches connected to said stationary antenna array, one for each antenna, each when actuated coupling a respective antenna to said second receiver, and means responsive to said calculated switching times for actuating said microwave switches sequentially as a function of the pointing direction of the SSR beam.

10. In a system for indicating the position of a transponder with respect to a reference position at a known location within the service area scanned by the rotating beam of a secondary surveillance radar (SSR) by receiving on a first receiver at said reference position interrogations from said SSR and receiving on a second receiver replies from the transponder and processing the information received by said first and second receivers and determining the position of the transponder from the time relationship between said received interrogations and replies and the scanning period of said rotating beam, the improvement comprising, at said reference position:

a plurality of directive antennas arranged in a stationary circular array each having a directional radiation pattern pointing in different direction from the center of said array and each covering a respective angular sector, said reference position being spaced from said SSR by a distance that causes said rotating SSR beam to sometimes overlie two or more of said sectors;

a plurality of RF switches each connected to a respective antenna of said array each when actuated coupling a respective antenna to said second receiver; and means responsive to the pulse repetition pattern of interrogations received from said SSR and the instantaneous pointing direction of said rotating SSR beam for calculating which and at what times said RF switches should be actuated based on the time it takes in the geometrical arrangement between the rotating SSR beam and the radiation patterns of the antennas of said array for a given SSR interrogation pulse, after launch from said SSR, to reach a first imaginary line that separates a sector first entered by said pulse from its next adjacent sector in the direction of rotation of said beam, to propagate a distance along said beam from said first imaginary line to a second imaginary line that separates s id next-adjacent sector from its next-adjacent sector, and at said calculated times actuating the appropriate RF switch to connect to said second receiver the antenna of said array which covers the sector that said given interrogation pulse propagating along the SSR beam is then entering.

11. Apparatus according to claim 10, wherein said means for calculating switch actuating times further includes mean for altering the timing of the interrogation pulses received by said receiver by an amount corresponding to the pulse propagation time from said SSR to said reference position.

* * * * *

UNITED STATES PATENT AND TRADEMARK OFFICE
CERTIFICATE OF CORRECTION

PATENT NO. : 5,198,823
DATED : March 30, 1993
INVENTOR(S) : Litchford et al.

It is certified that error appears in the above-identified patent and that said Letters Patent is hereby corrected as shown below:

Col. 3, line 10, "the" should read --the invention--;

line 57, "8 [sec." should read --8 µsec.--.

Col. 8, line 43, "420[sec." should read --420 µsec--;

line 65, "pSSR" should read --PSSR--.

Col. 9, line 66, "(215°the" should read --(215°) the--.

Col. 10, line 5, "o" should read --of--;

line 12, "o" should read --on--.

Col. 11, line 25, "SSR" should read --PSSR--.

Col. 15, line 8, "s id" should read --said--.

Signed and Sealed this

Seventh Day of December, 1993

Attest:

BRUCE LEHMAN

Attesting Officer

Commissioner of Patents and Trademarks